United States Patent [19]

Kuhl et al.

[11] Patent Number: 5,376,770
[45] Date of Patent: Dec. 27, 1994

[54] PROCESS AND DEVICE FOR MACHINING WORKPIECES BY MEANS OF A LASER BEAM

[75] Inventors: Michael Kuhl, Füssen; Alfred Zwick, Görisried; Günter Eberl, Betzigau, all of Germany

[73] Assignee: MAHO Aktiengesellschaft, Germany

[21] Appl. No.: 3,924

[22] Filed: Jan. 13, 1993

[30] Foreign Application Priority Data

Jan. 13, 1992 [DE] Germany ............................ 4200632

[51] Int. Cl.$^5$ ............................................. B23K 26/02
[52] U.S. Cl. ....................... 219/121.83; 219/121.69; 219/121.71; 219/121.85
[58] Field of Search ............. 219/121.68, 121.69, 219/121.7, 121.71, 121.83, 121.78, 121.79, 121.85

[56] References Cited

U.S. PATENT DOCUMENTS

| | | | |
|---|---|---|---|
| 4,825,035 | 4/1989 | Moriyasu et al. | 219/121.61 |
| 4,914,270 | 4/1990 | Copley et al. | 219/121.68 |
| 5,063,280 | 11/1991 | Inagawa et al. | 219/121.7 |
| 5,237,148 | 8/1993 | Aoki et al. | 219/121.7 |

FOREIGN PATENT DOCUMENTS

| | | | |
|---|---|---|---|
| 0180293 | 8/1991 | Japan | 219/121.64 |
| 2241594 | 9/1991 | United Kingdom | 219/121.71 |

OTHER PUBLICATIONS

Tönshoff et al., "Laserfräsen-Formabtrag mit Hochleistungslasern", in Laser-Magazin, vol. 6, pp. 16–24 (1991).
Baier, "Elektronik Lexikon," Franck'sche Verlagshandlung, W. Keller & Co., Stuttgart, pp. 406, 407 (1982).

Primary Examiner—C. L. Albritton
Attorney, Agent, or Firm—Baker, Maxham, Jester & Meador

[57] ABSTRACT

A process for precision control of a laser beam for machining workpieces while achieving high surface quality. The actual distance between a reference location and the workpiece surface is determined. A setpoint/actual value deviation between a predetermined setpoint distance and the actual distance measured is also determined. Control parameters are determined by a control unit in accordance with the setpoint/actual value deviation. The resulting control parameter outputs are coupled to a laser control unit to control the beam power of the laser. The disclosure also includes the apparatus for accomplishing the process.

35 Claims, 5 Drawing Sheets

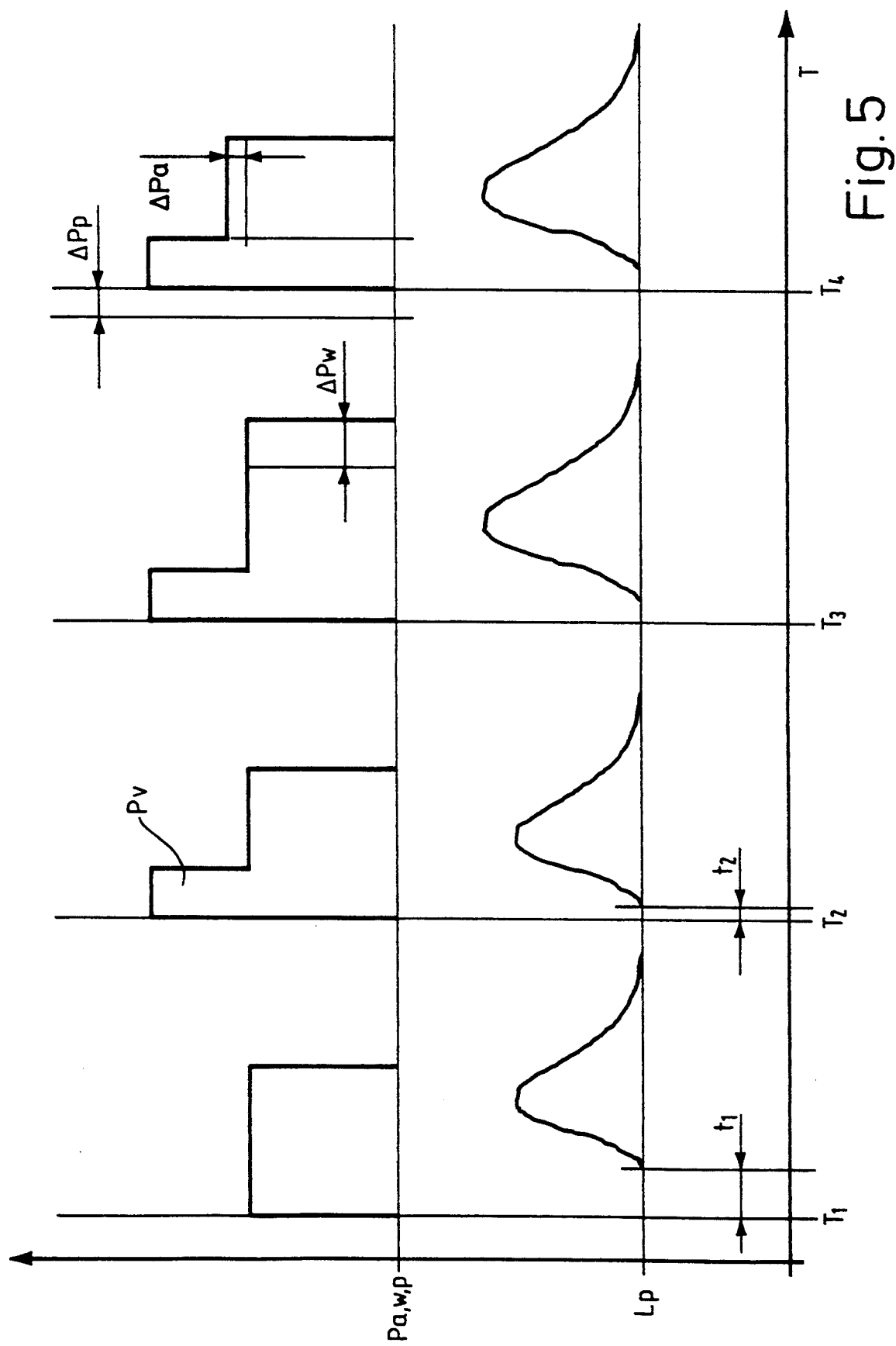

PROCESS AND DEVICE FOR MACHINING WORKPIECES BY MEANS OF A LASER BEAM

FIELD OF THE INVENTION

This invention concerns a process for machining workpieces by means of a laser beam, whereby the radiation coming from the machining point on the workpiece surface is detected and processed to yield signals. The machining operation is regulated by means of at least one control parameter derived on the basis of these signals.

The invention also concerns a device for machining workpieces by means of a laser beam, with a measurement unit, a laser stimulating unit and an electronic control unit.

BACKGROUND OF THE INVENTION

German patent 3,424,825 describes a process whereby the laser intensity is maintained between defined limit values. For example, the intensity of the plasma luminance is detected continuously by a radiation sensor, and the laser intensity is regulated by modulation of the laser radiation in order to maintain the plasma and prevent an unwanted detonation wave. The control principle of this process is based on a two-point controller with the known disadvantages such as the dependence of the cutoff frequency of the controller on the time constant of the control circuit. Therefore, this process is not suitable for precision adjustment of the laser intensity in order to achieve precision removal of material from a workpiece.

German patent 3,926,859 discloses a process and a device for cutting or perforating workpieces, especially those made of metal, with a laser beam, where the machining point on the workpiece is monitored with a radiation sensor that measures the prevailing workpiece temperature by detecting the heat radiation. This patent describes a two-point controller that cuts off the laser beam on reaching an upper limit for the workpiece temperature and turns the laser on again on reaching a lower workpiece temperature. Therefore, the laser is pulsed by reaching the upper and lower workpiece temperatures.

It is known that lasers need a certain amount of time from stimulation to emission=of the laser radiation. This is especially true of solid-state lasers (e.g., an Nd:YAG laser) and for gas lasers (e.g., a $CO_2$ laser). With solid-state lasers the delay time or lag is higher by approximately one power of ten. In addition, the laser continues to pump after the laser beam has been switched off. The cutoff frequency of the two-point controller is determined by these specific time constants of the laser which also change with the pulse frequency of the laser (according to German patent 3,926,859). For this reason, the cutoff frequency of the laser pulses cannot be raised above a certain level because otherwise the laser pulses would overlap and would thus raise the minimum energy level in the machining operation. Due to the laser-specific time constants when using a two-point controller for controlling the laser beam, it is necessary to operate with a low cutoff frequency, which leads to relatively large power pulses. Therefore, the amount of material removed from the workpiece in the forward movement of the laser over the material in one layer cannot drop below a certain limit.

When the laser beam strikes the material, there is an increase in temperature within a very short period of time which is in the range of nanoseconds. The control parameter for controlling a laser such as the beam power must respond at least equally rapidly. If this is not the case, then such a control system becomes unstable.

The dynamics of the laser, that is, the system-specific response time and the continued pumping of the laser radiation after the system has been shut down, are effective in the control circuit with a two-point controller according to German patent 3,926,859, which detects the radiation of one pulse and regulates the same pulse with the signal thus derived, but this leads to laser pulses that cannot be reproduced accurately. Therefore, a controller that contains the time constants of the laser in the control circuit is not suitable for precision removal of material by machining in this way.

In addition, the inherent dynamics of lasers are approximately constant only at pulse frequencies that vary within certain very narrow limits. If a self-pulsing laser is used, then the frequency of the laser pulses changes constantly. Thus, the response time of the laser to stimulation pulses also varies, which thus makes precision machining with a very small depth of removal of material such as 1 $\mu$m virtually impossible.

SUMMARY OF THE INVENTION

The purpose of this invention is to provide a process and device for machining workpieces by means of a laser beam in such a way as to permit removal of more material and also reproducible precision removal of material from a workpiece while achieving a high surface quality.

This purpose is realized by this invention by a process whereby an actual distance between a reference point and the surface of the interaction zone of the machining point is determined, a setpoint/actual value deviation between a given setpoint distance and the actual distance detected is determined, at least one control parameter is derived by the control unit in accordance with the setpoint/actual value deviation, and the resulting control parameters are output to at least one controller.

Stimulation of the laser can be varied essentially without any influence of time constants by means of the control pulses generated by the process according to this invention. A time constant here, for example, is the period of time between the rising flank of a control pulse emitted to the laser stimulating unit and the onset of the laser pulse and thus the laser radiation. This results in a high reproducibility of the laser pulses with regard to time, so the respective control parameter can be controlled with a high degree of accuracy. This makes it possible to remove very fine layers of material in a reproducible and advantageous manner and with a constant thickness.

An advantageous embodiment of this invention is characterized in that in addition to determining the actual distance and determining the deviation between the setpoint distance and the actual distance, a machining depth that corresponds to the distance between the surface of the interaction zone and a base line is determined, the deviation in machining depth is determined from the machining depth and the deviation between the setpoint and actual value, and at least one control parameter is derived according to the machining depth deviation.

Due to the combination of the determination of distance from a reference point to the surface of the machining point and the depth of the machining point (zone of interaction), the actual machining depth can be determined for each layer of material removed during the machining operation. Thus, the control parameter contains a real process parameter that takes into account the amount of material converted, melted and burned at the machining point on the workpiece.

The above control processes can be used for $CO_2$ lasers as well as Nd:YAG lasers (CW lasers). In addition, the control system can process the control deviation in such a way that laser pulses are generated only when the machining operation has not yet reached the setpoint depth.

In another advantageous embodiment of this invention, the beam power of the laser can be adjusted as a control parameter by way of the control unit. For this purpose, amplitude-modulated, pulse width-modulated and/or frequency-modulated control pulses can be emitted to the laser stimulating unit. Furthermore, the relative speed between the workpiece and the laser beam can be varied as a control parameter by output of speed-modulated control pulses to a forward feed unit, for example.

In another advantageous embodiment of this invention, the relative speed of forward movement of the laser beam can be detected, the laser power can also be controlled in accordance with the measured value thus derived. The laser power can be read out from two two-dimensional matrices, for example, where one matrix contains a machining depth deviation that has been detected and/or a setpoint/actual value deviation in the measured distance value in one dimension and the radiation power in the other dimension. The other matrix may contain, for example, the relative speed of forward movement and the laser power. The laser power can be varied, for example, by an amplitude-modulated control pulse. These two matrices can be multiplied and/or folded in order to obtain the desired laser power. The above measures are especially advantageous for the end areas of a meandering pattern machining a workpiece.

In addition, the machining process can also be controlled by other controllers such as an adaptive optical system that is adjustable by way of piezoelectric elements, for example, so the laser beam can be defocused in a controlled manner, with an influence on the radiation power of the laser. In another example, the oxygen supply and/or the intensity of the laser radiation can also be controlled. For example, when using an Nd:YAG laser, a shutter that interrupts the path of the laser beam in a controlled manner may also be used as a control element. Such a shutter may be based on a mechanical, electrooptical or magnetooptical principle (Kerr effect, LC shutter, etc.), as desired.

Alternatively, two or more control parameters may also be used to regulate the process. With a two-parameter control system, a velocity modulation signal and a radiation power modulating signal may be used as control parameters to regulate the process. These control parameters can be determined in an advantageous manner in a multiprocessor system in real time parallel processing. This permits a great reduction in the computation time required to determine the control parameters, so the response times of the process variables as well as the control accuracy can be improved.

In addition, the depth of machining can also be detected according to this invention by means of a radiation sensor that detects the heat radiation emitted by the interaction zone and thus obtains a value that can be correlated with the volume of the interaction zone. Thus, the depth of machining can be determined by analyzing the intensities of different wavelengths. The radiation sensor yields a signal for the actual amount of material removed in machining. Through the combination of the measurement of the absolute depth (machining depth) of the machining point and the relative distance signals, influences such as changes in machining temperature, changes in flow conditions, changes in material composition, etc., can be detected during machining in a layer of material being removed from the workpiece. Very accurate control of the laser power is made possible in this way.

In another advantageous embodiment of this invention, the signals of the distance sensor and/or the radiation sensor are detected during output of a laser pulse and thus control pulses for at least one immediately following laser pulse are generated. Thus, the detection of the control parameters and the determination of the control pulses are uncoupled from the output of the control pulses. In this way, the inherent dynamics of the laser are separated from the control circuit and are no longer contained in the transmission element of the controller and thus in the control circuit. Since the frequency of the control pulses is varied only within certain limits, the inherent dynamics of the laser are also approximately constant. Therefore, a laser radiation power that is highly reproducible can be generated, as is necessary for machining defined layers of material having a small thickness.

In another advantageous embodiment of this invention, the actual distance and/or the machining depth are detected by means of a group of laser pulses and then averaged. In this way, fluctuations caused, for example, by electric disturbance in the signals detected can be compensated. These fluctuations can be caused by electromagnetic fields acting on the transmission lines of the sensors. In addition, detection of the measurement signals can be adapted to the computation power of the control unit in this way.

Furthermore, a first control pulse can be given at the start of machining. This is advantageous because at the start of machining no laser pulse has yet been applied to the workpiece, so the control parameter does not contain any information regarding the status of the process.

In linear machining in several successive layers in order to create a cavity in a massive workpiece, the actual measured distance can be compared with the setpoint distance of the last layer machined at the beginning of a new layer to be removed by machining. This yields a difference between the depth of machining actually achieved during the last machining layer and the setpoint depth of machining set for the last machining layer in an advantageous manner. This difference can then be used as the corrective value or factor for regulating additional machining layers. As a result of this correction, a deviation in the depth of machining can be compensated, whereas in the absence of such a correction this deviation would be additive from one machining layer to the next. This makes it possible to achieve a considerable increase in accuracy in machining.

To determine the control pulses which act as control parameters of the machining process to directly influence the radiation power of the laser, the nth derivations of the setpoint/actual value deviation and/or the machining depth deviation can also be determined. This makes it possible to achieve faster and more accurate system responses to changes in the input parameters. In addition to linear correlations, P, PI or PID control algorithms may also be used. Furthermore, control systems based on so-called fuzzy logic may also be used to determine the control parameters.

The control pulses for controlling the laser stimulating unit may be calculated from the setpoint/actual value deviation, the machining depth deviation or the difference in distances. To reduce computation time, however, it may also be advantageous to read out the control pulses or the control parameters from a matrix. The control pulses are stored in a read-only memory in this embodiment of the invention and can be read out of the matrix in a memory in the control unit as a function of the setpoint/actual value deviation, the machining depth deviation or the difference in distances. The control pulses here are determined under comparable conditions during experimental machining operations and stored for future reference.

The matrix values may also have a functional dependence on the relative speed between the workpiece and the laser beam. These velocity-dependent values can be stored temporarily, but determination of corresponding control parameters by reading them out of the matrix may also be advantageous (shortening the computation time). In this case, speed-dependent factors may be combined with the matrix value read out of the matrix by either addition and/or multiplication.

The control pulses may be calculated as absolute values or they may be read out of a matrix. To reduce computation time it may be advantageous not to calculate the control pulses as absolute values but instead to determine their increments or decrements. The required computation time for adding a small increment or subtracting a small decrement in comparison with the absolute value is shorter in comparison with the time required to process the absolute control pulses owing to the smaller number of bits required for the variables in the computation unit.

The laser pulses generated on the basis of the control pulses are specific for the system and have a time lag in comparison with the control pulses as a function of frequency. For example, if a $CO_2$ laser is controlled with 10 kHz control pulses, then the time constant between the control pulse and the respective laser pulse will be approximately 15 $\mu$sec. The start of the laser pulse has a range of variation of about $\pm 2$ $\mu$sec. This time fluctuation in the start of the laser light is referred to as jitter. This jitter effect can be reduced by having a prefix pulse precede the control pulse. This prefix pulse, whose area is not affected by the control parameters, has an amplitude that is excessive in comparison with that of the control pulses and it has a reduced pulse width in comparison with the control pulses. The start of the prefix pulse is regulated in such a way that the rising flank of the prefix pulse coincides with the rising flank of the control pulse. Furthermore, the response time, that is, the time constant between the control pulse and the respective laser pulse, is also reduced by the prefix pulse. With 10 kHz laser pulses of a $CO_2$ laser, response times of 3 $\mu$sec and a jitter of $\pm 1$ $\mu$sec can be achieved with a prefix pulse. By using the prefix pulse the possible variation in pulse frequency and the pulse pauses between successive laser pulses can be increased in an advantageous manner in order to change the laser power as a control parameter without modifying the response of the laser pulses to the control pulses so greatly that the desired reproducible precision machining is no longer assured. This change in pulse frequency by adding a prefix pulse preferably amounts to about 10$\pm$2 kHz for a pulsed $CO_2$ laser.

In another advantageous embodiment of this invention, the required ON time for the laser is reduced and implemented in a time-discrete manner. To do so, the laser is kept approximately at the temperature required for operation of the laser by simmering below the laser threshold. The energy introduced by simmering is just below the energy level that would be needed to raise the laser above the laser threshold. This is especially advantageous when the material is removed only in some areas in order to produce special contours in the workpiece. In doing so, the workpiece or the laser head is moved continuously during the operation and the laser is kept in a stimulated stated by simmering when passing over certain areas of the workpiece where no machining is to take place. During the time of machining between the individual laser pulses, simmering is not used because the laser is in its operating state anyway. Simmering assures that the first control pulse will also produce a laser pulse.

The problem on which this invention is based is also solved by a device for machining workpieces by means of the laser radiation emitted by a laser and is characterized in that the measurement unit has a distance sensor and a control unit. In an embodiment of this device, the measurement unit has a radiation sensor with whose signal the depth of machining is determined.

One of the main advantages of this invention is that the inherent dynamics of the laser can be separated from the control circuit of the controller and are not contained in the transmission element. In this way, it is possible to measure an actual laser pulse and the next laser pulse or subsequent laser pulses are regulated accordingly (in contrast with regulation of the measured actual laser pulse). In addition, the inherent dynamics of the laser are kept approximately constant by means of a pulse frequency that changes only within certain limits and by adding a prefix pulse before the control pulse. In addition, the response time between a control pulse and the respective laser pulse can be reduced by simmering and by adding a prefix pulse. Thus, the period of time that elapses between stimulation of the laser and emission of laser light is minimized, and the range of variation in the onset of the laser light (jitter) is also reduced.

In addition, this invention yields a very high pulse-to-pulse stability due to the reduction in range of scattering of the laser pulses.

Another important advantage of this invention is that three-dimensional control of the laser is made possible. By determining the distance between a reference point and the surface point of the machined location, the laser radiation can be directed to a location that is precisely defined geometrically in a plane. By adding the determination of the machining depth as a control parameter, the "effective depth" of the laser beam is also used to control the process. This permits an extremely accurate method of controlling the laser, which is an advantage in precision removal of material.

BRIEF DESCRIPTION OF THE DRAWING

The objects, advantages and features of this invention will be more readily perceived from the following detailed description, when read in conjunction with the accompanying drawing, in which:

FIG. 5 shows a time-based flowchart with control pulses and the respective laser pulses.

DESCRIPTION OF THE PREFERRED EMBODIMENTS

Figure 1:
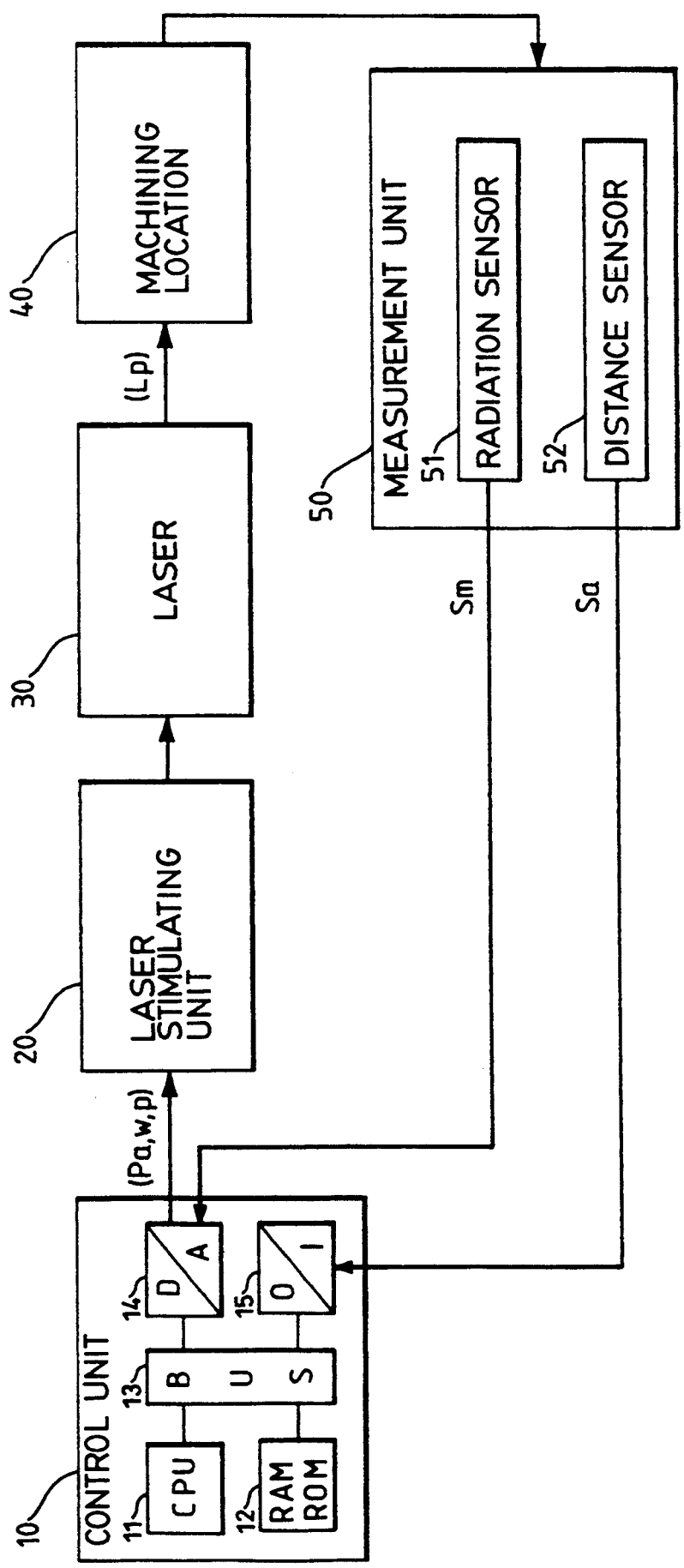
FIG. 1 is a schematic equivalent circuit of a laser machining device.

The schematic equivalent circuit of FIG. 1 shows control unit 10 with central processing unit (CPU) 11, memory 12 with random access memory (RAM) and read-only memory (ROM), address bus and data bus 13, digital/analog (D/A) analog/digital converter (A/D) 14 and input/output (I/O) unit 15. Not shown in this schematic diagram are the customary input and output units for the control unit such as a keyboard, a display screen and a printer. In addition, control unit 10 may be connected to the program controller of a CNC machine and to a local area network (LAN) and/or a wide area network (WAN) for integration into a computer integrated manufacturing (CIM) system.

The control unit sends control pulses Pa,w,p by way of D/A converter 14 to laser stimulating unit 20 for controlling laser 30. Laser stimulating unit 20 may be, for example, an HF generator that is connected directly to laser electrodes of laser 30 and generates a glow discharge there. Laser 30 may be a solid-state laser or a gas laser which is usually operated in pulsed operation. Preferably, a $CO_2$ laser is used for removal of material by machining.

Laser 30 emits laser pulses Lp by way of the control pulses Pa,w,p controlled by laser stimulating unit 20. These laser pulses Lp are directed through an optical system (not shown) onto machining position or location 40. Machining location 40 is monitored by measurement unit 50. Measurement unit 50 contains distance sensor 52 and, optionally, radiation sensor 51.

For example, the heat radiation of the interaction zone between the laser radiation and the machined material, i.e., machined location 40 in the workpiece, can be detected by means of radiation sensor 51. The size of the interaction zone can be deduced from signal Sm of radiation sensor 51 picked up by control unit 10 from A/D converter 14. In this way, a value that corresponds to the depth of the zone of interaction can be determined.

Distance sensor 52 determines the distance between fixed reference point 44 (FIG. 2) and surface 45 of machining location 40. Signal Sa from distance sensor 52 is picked up by control unit 10 by way of I/O unit 15.

Figure 2:
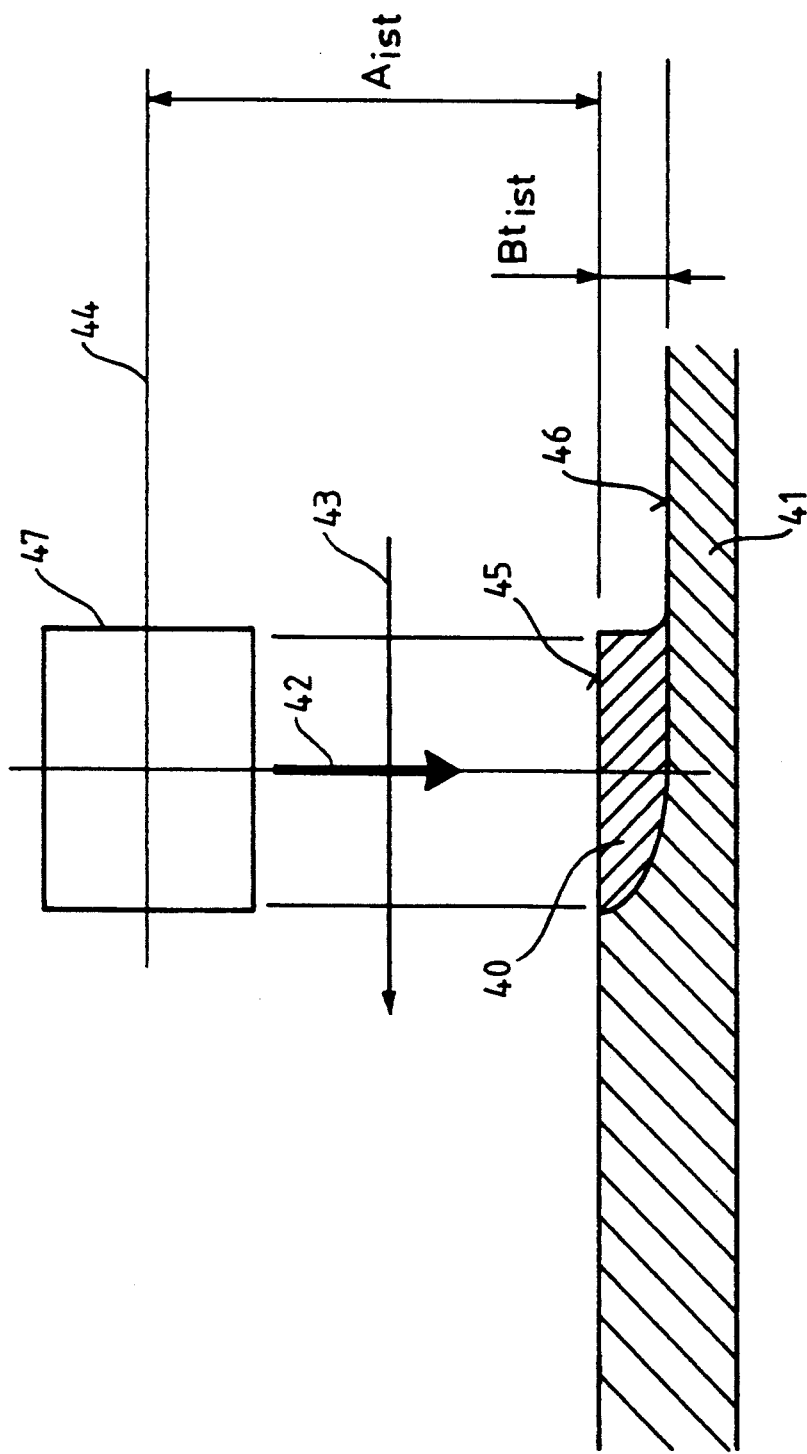
FIG. 2 is a schematic sectional diagram of the machined location.

FIG. 2 depicts a machining operation in workpiece 41. Laser beam 42 and, optionally, an auxiliary gas, strike surface 45 of workpiece 41, forming machined location 40 in this sample diagram. The relative feed direction between workpiece 41 and laser beam 42 is indicated by arrow 43. Actual distance $A_{ist}$ is indicated between reference location 44, which may be on laser head 47, and surface 45 of machined location 40. This actual distance is measured by distance sensor 52. In addition, depth of machining $Bt_{ist}$ is shown between surface 45 of machined location 40 and base line 46. This depth can be determined by means of radiation sensor 51. Radiation sensor 51 and distance sensor 52 can be located on the axis of the laser beam or at some other geometric location (not shown).

Figure 3:
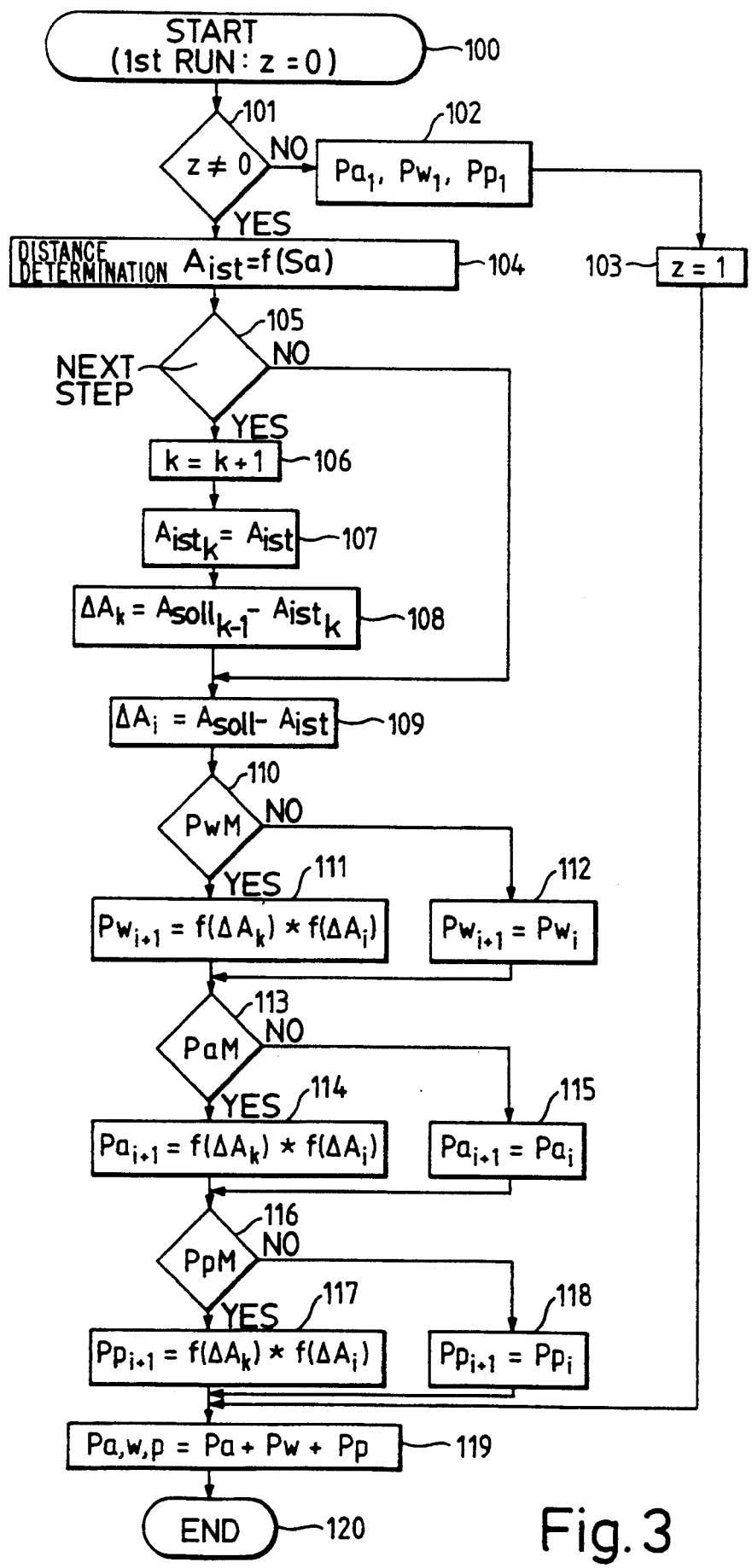
FIG. 3 shows a flowchart for carrying out the process according to this invention.

A schematic flowchart of the process according to the embodiment in FIG. 3 shows a program sequence through which control unit 10 runs. This program sequence is stored at a defined address in the RAM or ROM and can be called up by an operator or according to a CNC-controlled system. In the first run through the program, program run counter z is set at zero at the start (step 100). In the first run through the program, control parameters $A_{ist}$ and/or $Bt_{ist}$ may be zero or may be incorrect, so step 101 determines whether this is the first run. If this is the case, stored values $Pa_1$, $Pw_1$ and $Pp_1$ are used for the pulse amplitude, the pulse width and pulse pause (step 102). Then program run counter z is set at 1 (step 103) and next the program branches off to step 119. In step 120 the program is either terminated or it branches back to step 101. In the next run through the program, distance $A_{ist}$ is determined from signal Sa of distance sensor 52 (step 104). Distance $A_{ist}$ is calculated to step 104 in each run through the program or it is read out of a matrix. Then the program determines whether the current run through the program is the first run through the program (step 105). If this is the case, a distance difference ($\Delta A_k$) is calculated which corresponds to the difference between the setpoint distance of last machining layer $A_{soll\ k-1}$ and actual distance $A_{ist\ k}$ determined in step 104 (steps 106–108). If this run is not the first run through the program, then the program branches off directly to step 109 where, in order to form setpoint/actual value deviation $\Delta A_i$, the difference between setpoint distance $A_{soll}$ and actual distance $A_{ist}$ is formed (step 109). Setpoint distance $A_{soll}$ may be a value stored in the ROM, for example, or it may be a value input by an operator or a value determined by a CNC controller. In addition, setpoint/actual value deviations $\Delta A_i$ can also be calculated separately for each run through the program or read out of the matrix.

After determining setpoint/actual value deviation $\Delta A_i$, control pulses Pa,w,p are determined as a function of setpoint/actual value deviation $\Delta A_i$ (steps 110–119).

Control pulses Pa,w,p have a defined amplitude, pulse width and pulse pause, each component Pa, Pw and Pp being determined separately in this example. However, the determinations can also be combined, in which case characteristic values are determined to characterize the pulse amplitude, the pulse width and the pulse pause of control pulses Pa,w,p. If the program branches off to step 112 in step 110, the pulse width of control pulse Pa,w,p does not change and the preceding value of the pulse width is used for the next control pulse Pa,w,p. However, if pulse width modulation is performed, then the program branches off to step 111. In step 111 the next pulse width $Pw_{i+1}$ can be determined as a function of the distance difference $\Delta A_k$ (correction factor) and the setpoint/actual value deviation $\Delta A_i$. Steps 113–115 determine whether the pulse amplitude of control pulse Pa,w,p should be modified. If this is the case, then the program branches off to step 114, where pulse amplitude $Pa_{i+1}$ for the next control pulse Pa,w,p can be determined as a function of distance difference $\Delta A_k$ and setpoint/actual value deviation $\Delta A_i$. If this is not the case, then the previous pulse amplitude is used for the next pulse amplitude (step 115). Step 116 determines whether a pulse pause and thus the pulse repetition rate (pulse frequency) are to be modulated, which is then performed in step 117. In step 118 the preceding value is used for the next pulse pause component $Pp_{i+1}$. Then in step 119 the components of the pulse amplitude, the pulse width and the pulse pause are combined to form the final control pulse Pa,w,p. In steps 111 and 114 and/or 117 the pulse width component, the pulse amplitude component and the pulse pause component of the control pulses Pa,w,p can also be read out of matrices. These matrices may contain prestored values for the pulse width components, the pulse amplitude components and the pulse pause components of control pulses Pa,w,p as a function of at least setpoint/actual value deviation $\Delta A_i$. Moreover, as an additional dimension, a correction factor such as the distance difference $\Delta A_k$ may also be used for the matrix. In steps 111, 114 and/or 117 the absolute value of each control pulse component is determined. However, increments or decrements which are then added to or subtracted from the existing absolute values may also be determined. Then in step 120 the program branches off (not shown) to step 100 or the program sequence is terminated.

Figure 4:
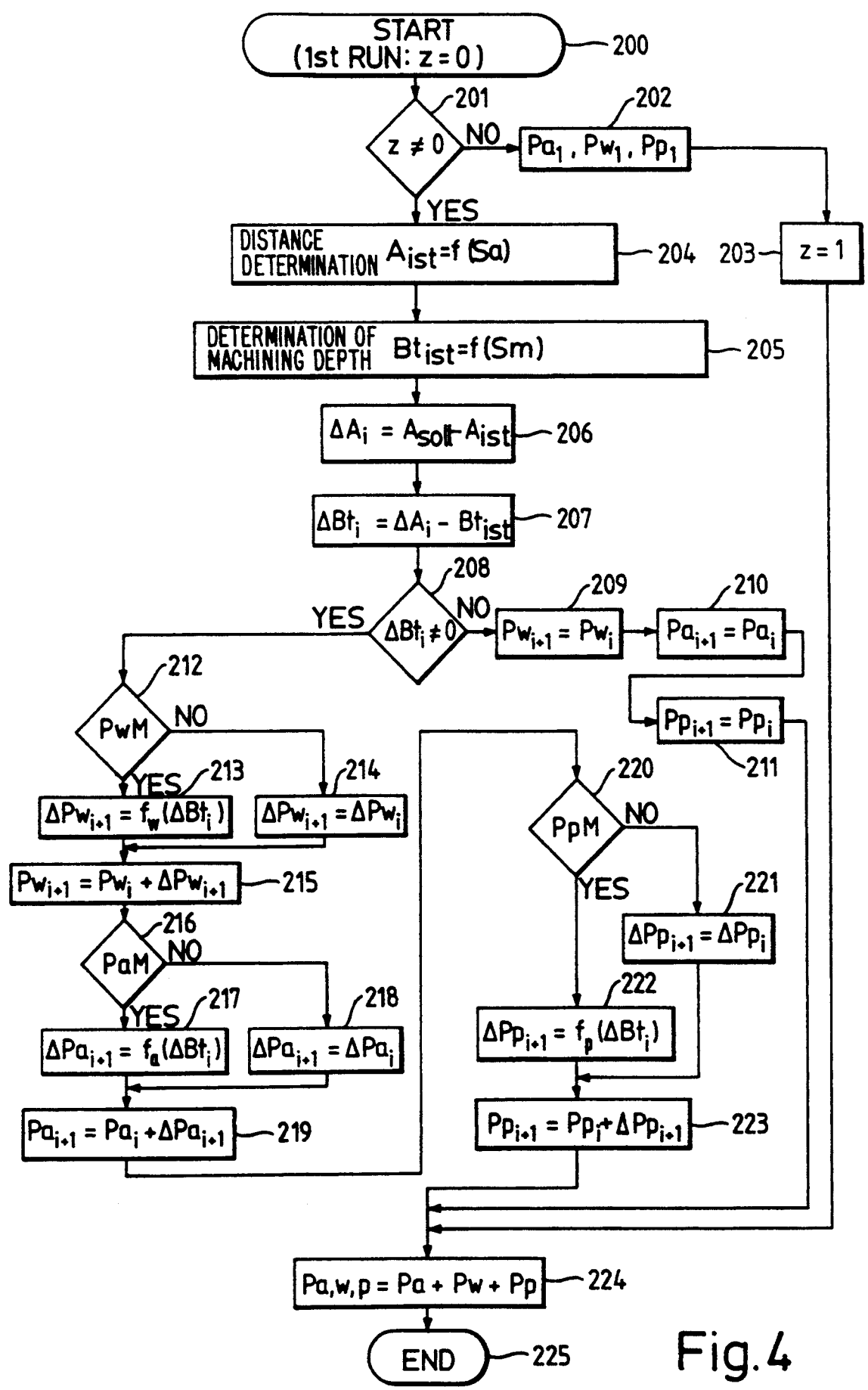
FIG. 4 is a flowchart of another embodiment for carrying out the process according to this invention.

FIG. 4 shows another flowchart for another embodiment of the process according to this invention. Function blocks that are identical to those described with regard to FIG. 3 will not be discussed in detail below. In step 205 machining depth $Bt_{ist}$ is determined as a function of signal Sm of radiation sensor 51. Machining depth $Bt_{ist}$ is then read out of a matrix. Then in step 206 setpoint/actual value deviation $\Delta A_i$ is determined from the difference between setpoint distance $A_{soll}$ and actual distance $A_{ist}$. Next, in step 207 machining depth deviation $\Delta Bt_i$ is determined from the difference between setpoint/actual value deviation $\Delta A_i$ determined in step 206 and machining depth $Bt_{ist}$. In the event machining depth deviation $\Delta Bt_i$ assumes a value not equal to zero (or greater than a limit value), then a change in the radiation power of laser 30 is necessary because the machining depth is too great or too small. However, if machining depth deviation $\Delta Bt_i$ is equal to zero (or is smaller than a limit value), then the control pulse Pa,w,p is not modified (steps 209, 210, 211). In step 213 a pulse width increment or decrement for the next pulse $\Delta Pw_{i+1}$ is determined as a function of machining depth deviation $\Delta Bt_i$. $\Delta Pw_{i+1}$ can also be read out of a matrix. In step 215 the absolute value of the pulse width component $Pw_{i+1}$ for the next control pulse is then determined by addition of the pulse width component of the last pulse and the increment or decrement. Instead of determining the increment or decrement (steps 213, 215), the absolute value of pulse width component $Pw_{i+1}$ can also be determined. This determination can be performed by means of a calculation and/or by reading the value out of a matrix.

Steps 216 and 223 differ from steps 212 to 215 only in that the pulse amplitude components of control pulses Pa,w,p are determined in steps 216 to 219, and the pulse pause components are determined in steps 220–223, so what was described above also applies to these steps.

In step 224 the pulse amplitude components, the pulse width components and the pulse pause components are then combined to yield control pulse Pa,w,p. In step 225 the program then branches off (not shown) to the start (step 200) or the program sequence is terminated.

The decision as to whether pulse width modulation, pulse amplitude modulation and/or pulse pause modulation is to be performed (steps 111, 114, 117) can be made by the operator. The branching decisions can also be made by way of a subprogram (not shown) as a function of preset or determined process parameters.

FIG. 5 shows as an example four different control pulses Pa,w,p and the respective laser pulses Lp in a flowchart as a function of time. Control pulses Pa,w,p are generated by control unit 10, whereby laser 30 delivers laser pulses Lp with system-specific lag time $t_1$, $t_2$ (response time, time constant). The response time $t_i$, $t_2$ depends, for example, on the pulse frequency of successive control pulses Pa,w,p, the operating condition of the laser and the pulse form of control pulses Pa,w,p. In this diagram a control pulse Pa,w,p in the form of a square-wave signal is generated at time $T_i$. This control pulse Pa,w,p causes laser pulse Lp which is delivered with a time lag of $t_i$.

If a prefix pulse Pv is added before control pulse Pa,w,p at time $T_2$, the result is a time lag $t_2$ of laser pulse Lp for which it holds that $t_1 > t_2$. Thus the response time of the laser pulses is shortened by the prefix pulse. This also makes it possible to vary the pulse pause within certain limits without having too much influence on the reproducibility of the laser pulses with regard to precision removal of material.

The beam power of laser 30 can be varied by a pulse-to-pulse change in pulse amplitude $\Delta Pa$, pulse width $\Delta Pw$ and pulse pause $\Delta Pp$ of control pulses Pa,w,p. At time $T_3$ control pulse Pa,w,p has a pulse width that is larger by $\Delta Pw$ in comparison with control pulse Pa,w,p at time $T_2$, so control pulse Pa,w,p has a larger area and thus laser 30 emits a laser pulse with a higher power. At time $T_4$ the pulse amplitude is larger by $\Delta Pa$ in comparison with time $T_2$ and the control pulse starts earlier by the amount $\Delta Pp$. Due to this increase in pulse amplitude by $\Delta Pa$, the power of the respective laser pulse Lp increases in accordance with control pulse Pa,w,p. Due to the offset in the control pulse by $\Delta Pp$, the average energy density of laser pulses Lp also increases as long as the area of the control pulses in the period of time in question is kept constant or at least is not reduced.

In addition, prefix pulse Pv reduces the jitter, which contributes toward optimization of the reproducibility of laser pulses Lp. With the optimized reproducibility of the laser pulses, the precision in control and thus the accuracy in machining to remove layers of material of the workpiece are also improved, so the depth of the layer machined can also be minimized. In addition, the machining quality, i.e., the peak-to-valley roughness in machining, can be improved by optimizing the reproducibility of laser pulses Lp and the possibility of reducing the laser power.

In addition, simmering of the laser can be used to move the laser over certain areas of the workpiece for flying machining (intermittent machining) of the workpiece. Simmering can be used, for example, when the laser has been turned off for a long period of time and is turned on only at the moment when the first laser pulse is generated, i.e., simmering is stopped on the descending flank of the laser pulse. Simmering also makes it possible to reduce the time lag $t_i$, $t_2$ when the laser has been turned off for a long period of time (flying machining).

To determine setpoint/actual value deviation $\Delta A_i$ and/or the deviation in the depth of machining $\Delta Bt_i$, the nth derivations of the differences can be used instead of the differences themselves to determine the deviation. In addition, control algorithms can be used to determine setpoint/actual value deviation $\Delta A_i$ and the deviation in the depth of machining $\Delta Bt_i$ (for example, P, I, PI and PID control algorithms). The advantage of using control algorithms is the faster response of the radiation power (or the control pulses) as a control parameter to the control parameters detected by the measurement equipment.

In view of the above description, it is likely that modifications and improvements will occur to those skilled in this technical field which are within the scope of the appended claims.

What is claimed is:

1. A process for machining workpieces by means of a laser beam, whereby the workpiece is machined by the laser beam line-by-line and layer-by-layer in thin layers that follow each other closely, the process comprising the steps of:
   comparing new machining layer K, a setpoint distance ($A_{soll\ k-1}$) of the preceding machining layer k-1 with a measured actual distance ($A_{ist\ k}$) of the present machining layer;
   determining a distance difference ($\Delta A_k$) from the result; and
   correcting at least one control parameter in accordance with the distance difference ($\Delta A_k$).

2. A device for machining workpieces by means of a laser beam, said device comprising:
   a measurement unit for detecting process parameters;
   a laser stimulating unit for controlling the laser; and
   an electronic control unit for processing measurement signals (Sa, Sm) from the measurement unit and for controlling a controller;
   said measurement unit having a distance sensor, said control unit being configured to have:
      means for determination of an actual distance ($A_{ist}$) from a signal (Sa) of said distance sensor, where the actual distance ($A_{ist}$) corresponds to the distance between a reference point and the workpiece surface at the machining location;
      means for determination of a setpoint/actual value deviation ($\Delta A_i$) between a given setpoint distance ($A_{soll}$) and the actual distance ($A_{ist}$) thus determined;
      means for determination at least one control parameter corresponding to the setpoint/actual value deviation ($\Delta A_i$); and
      means for coupling the control parameter to said controller.

3. The device recited in claim 2, wherein said measurement unit includes a radiation sensor that detects the machining depth ($Bt_{ist}$).

4. The device recited in claim 3, said control unit being configured to have:
   means for detecting the process radiation from the machining location by means of signal (Sm) of said radiation sensor and determining a machining depth ($Bt_{ist}$) that corresponds to the distance between said workpiece surface and a base line from the signal (Sm);
   means for determining a machining depth deviation ($\Delta Bt_i$) from the machining dept ($Bt_{ist}$) and the setpoint/actual value deviation ($\Delta A_i$); and
   means for determining a control parameter corresponding to the machining depth deviation ($\Delta Bt_i$).

5. A process for machining workpieces by means of a laser beam directed to a machining location on a workpiece having a surface exposed to the laser beam, the process comprising the steps of:
   regulating the process by means of a control unit having control parameter outputs to a laser control unit for selectively controlling parameters of the laser beam, the parameters being selected from the group consisting of laser beam power, intensity of the laser radiation, and laser beam power and the intensity of the laser radiation;
   determining an actual distance ($A_{ist}$) between a reference location and the workpiece surface of the machining location;
   determining a setpoint/actual value deviation ($\Delta A_i$) between a given setpoint distance ($A_{soll}$) and the actual distance ($A_{ist}$) measured;
   determining at least one control parameter by the control unit in accordance with the setpoint/actual value deviation ($\Delta A_i$); and
   coupling the control parameter output thus determined to a control unit.

6. A process for machining workpieces by means of a laser beam directed to a machining location on a workpiece having a surface exposed to the laser beam, the process comprising the steps of:
   regulating the process by means of a control unit having control parameter outputs to a laser control unit for selectively controlling the laser beam power and the intensity of the laser radiation;
   determining an actual distance ($A_{ist}$) between a reference location and the workpiece surface of the machining location;
   determining a setpoint/actual value deviation ($\Delta A_i$) between a given setpoint distance ($A_{soll}$) and the actual distance ($A_{ist}$) measured;
   determining at least one control parameter by the control unit in accordance with the setpoint/actual value deviation ($\Delta A_i$); and
   coupling the control parameter;output thus determined to a control unit.

7. A process for machining workpieces by means of a laser beam directed to a machining location on a workpiece having a surface exposed to the laser beam, the process comprising the steps of:
   regulating the process by means of a control unit having control parameter outputs to a laser control unit for selectively controlling the laser beam power and the intensity of the laser radiation;
   determining an actual distance ($A_{ist}$) between a reference location and the workpiece surface of the machining location;
   determining a setpoint/actual value deviation ($\Delta A_i$) between a given setpoint distance ($A_{soll}$) and the actual distance ($A_{ist}$) measured;
   determining at least one control parameter by the control trait in accordance with the setpoint/actual value deviation ($\Delta A_i$);
   coupling the control parameter output thus determined to a control unit; and
   regulating the laser beam as applied to the workpiece selectively by one or both of:
      moving the workpiece with respect to the laser beam, the relative forward speed of the workpiece being regulated as a control parameter by speed-modulated control pulses (Pg);
      regulating the beam power of the laser and/or the intensity of the laser radiation at the workpiece pursuant to a control parameter and selectively by means of amplitude-modulated, pulse-width modulated and/or frequency-modulated controlled pulses (Pa,w,p) by controlled defocusing of the laser beam and/or by means of a shutter.

8. A process for machining workpieces by means of a laser beam directed to a machining location on a workpiece having a surface exposed to the laser beam, the process comprising the steps of:

regulating the process by means of a control unit having control parameter outputs to a laser control unit for selectively controlling parameters of the laser beam, the parameters being selected from the group consisting of laser beam power, intensity of the laser radiation, and laser beam power and the intensity of the laser radiation;

determining an actual distance ($A_{ist}$) between a reference location and the workpiece surface of the machining location;

determining a setpoint/actual value deviation ($\Delta A_i$) between a given setpoint distance ($A_{soll}$) and the actual distance ($A_{ist}$) measured;

determining at least one control parameter by the control unit in accordance with the setpoint/actual value deviation ($\Delta A_i$); coupling the control parameter output thus determined to a control unit; and regulating the laser beam as applied to the workpiece selectively by one or both of:

moving the workpiece with respect to the laser beam, the relative forward speed of the workpiece being regulated as a control parameter by speed-modulated control pulses (Pg);

regulating the beam power of the laser and/or the intensity of the laser radiation at the workpiece pursuant to a control parameter and selectively by means of amplitude-modulated, pulse-width modulated and/or frequency-modulated controlled pulses (Pa,w,p) by controlled defocusing of the laser beam and/or by means of a shutter.

9. The process recited in claim 5, and comprising the further steps of:

determining the machining depth ($Bt_{ist}$) that corresponds to the distance between the workpiece surface of the machining location and a base line;

determining a machining depth deviation ($\Delta Bt_i$) from the machining depth ($Bt_{ist}$) and the setpoint/actual value deviation ($\Delta A_i$); and determining at least one control parameter corresponding to the machining depth deviation.

10. The process recited in either claim 5 or 9, wherein the beam power of the laser and/or the intensity of the laser radiation at the workpiece are regulated pursuant to a control parameter selectively by means of amplitude-modulated, pulse width-modulated and/or frequency-modulated control pulses (Pa,w,p) by controlled defocusing of the laser beam and/or by means of a shutter.

11. The process recited in either claim 5 or 9, wherein the workpiece is movable with respect to the laser beam and the relative forward speed of the workpiece is regulated as a control parameter by speed-modulated control pulses (Pg).

12. The process recited in claim 10, wherein the workpiece is movable with respect to the laser beam and the relative forward speed of the workpiece is regulated as a control parameter by speed-modulated control pulses (Pg).

13. The process recited in either claim 5 or 9, wherein the workpiece is movable with respect to the laser beam and the relative forward speed is determined in parallel with the regulation of the machining operation, and the beam power of the laser is also adjusted in accordance with the relative forward speed thus determined.

14. The process recited in claim 10, wherein the workpiece is movable with respect to the laser beam and the relative forward speed is determined in parallel with the regulation o f the machining operation, and the beam power of the laser is also adjusted in accordance with the relative forward speed thus determined.

15. The process recited in claim 11, the relative forward speed being determined in parallel with the regulation of the machining operation, and the beam power of the laser is also adjusted in accordance with the relative forward speed thus determined.

16. The process recited in claim 12, the relative forward speed being determined in parallel with the regulation of the machining operation, and the beam power of the laser is also adjusted in accordance with the relative forward speed thus determined.

17. The process recited in either claim 5 or 9, wherein at the beginning of a new machining layer K the setpoint distance ($A_{soll\ k-1}$) of the preceding machined layer k-1 is compared with the measured actual distance ($A_{ist\ k}$) of the present machining layer, a distance difference ($\Delta A_k$) is determined from the result and control pulses (Pa,w,p) are corrected in accordance with the distance difference ($\Delta A_k$).

18. The process recited in claim 10, wherein at the beginning of a new machining layer K the setpoint distance ($A_{soll\ k-1}$) of the preceding machined layer k-1 is compared with the measured actual distance ($A_{ist\ k}$) of the present machining layer, a distance difference ($\Delta A_k$) is determined from the result and control pulses (Pa,w,p) are corrected in accordance with the distance difference ($\Delta A_k$).

19. The process recited in claim 11, wherein at the beginning of a new machining layer K the setpoint distance ($A_{soll\ k-1}$) of the preceding machined layer k-1 is compared with the measured actual distance ($A_{ist\ k}$) of the present machining layer, a distance difference ($\Delta A_k$) is determined from the result and control pulses (Pa,w,p) are corrected in accordance with the distance difference ($\Delta A_k$).

20. The process recited in claim 13, wherein at the beginning of a new machining layer K the setpoint distance ($A_{soll\ k-1}$) of the preceding machined layer k-1 is compared with the measured actual distance ($A_{ist\ k}$) of the present machining layer, a distance difference ($\Delta A_k$) is determined from the result and control pulses (Pa,w,p) are corrected in accordance with the distance difference ($\Delta A_k$).

21. The process recited in claim 5 or 9, wherein measurement signals (Sa, Sm) are detected during the period of a laser pulse ($Lp_i$), and control pulses (Pa,w,p) for at least on laser pulse ($Lp_{i+n}$) immediately following this laser pulse ($Lp_i$) are derived.

22. The process recited in claim 10, wherein measurement signals (Sa, Sm) are detected during the period of a laser pulse ($Lp_i$), and control pulses (Pa,w,p) for at least on laser pulse ($Lp_{i+n}$) immediately following this laser pulse ($Lp_i$) are derived.

23. The process recited in claim 11, wherein measurement signals (Sa, Sm) are detected during the period of a laser pulse ($Lp_i$), and control pulses (Pa,w,p) for at least on laser pulse ($Lp_{i+n}$) immediately following this laser pulse ($Lp_i$) are derived.

24. The process recited in claim 13, wherein measurement signals (Sa, Sm) are detected during the period of a laser pulse ($Lp_i$), and control pulses (Pa,w,p) for at least on laser pulse ($Lp_{i+n}$) immediately following this laser pulse ($Lp_i$) are derived.

25. The process recited in claim 17, wherein measurement signals (Sa, Sm) are detected during the period of a laser pulse ($Lp_i$), and control pulses (Pa,w,p) for at least on laser pulse ($Lp_{i+n}$) immediately following this laser pulse ($Lp_i$) are derived.

26. The process recited in claim 5 or 9, wherein signals (Sa) corresponding to the actual distance ($A_{ist}$) and/or the signals (Sm) corresponding to the machining depth ($Bt_{ist}$) are determined over several laser pulses (Lp) and then averaged, and control pulses for the next laser pulse group are generated from the averaged signals.

27. The process recited in claim 10, wherein signals (Sa) corresponding to the actual distance ($A_{ist}$) and/or the signals (Sm) corresponding to the machining depth ($Bt_{ist}$) are determined over several laser pulses (Lp) and then averaged, and control pulses for the next laser pulse group are generated from the averaged signals.

28. The process recited in claim 11, wherein signals (Sa) corresponding to the actual distance ($A_{ist}$) and/or the signals (Sm) corresponding to the machining depth ($Bt_{ist}$) are determined over several laser pulses (Lp) and then averaged, and control pulses for the next laser pulse group are generated from the averaged signals.

29. The process recited in claim 13, wherein signals (Sa) corresponding to the actual distance ($A_{ist}$) and/or the signals (Sm) corresponding to the machining depth ($Bt_{ist}$) are determined over several laser pulses (Lp) and then averaged, and control pulses-for the next laser pulse group are generated from the averaged signals.

30. The process recited in claim 17, wherein signals (Sa) corresponding to the actual distance ($A_{ist}$) and/or the signals (Sm) corresponding to the machining depth ($Bt_{ist}$) are determined over several laser pulses (Lp) and then averaged, and control pulses for the next laser pulse group are generated from the averaged signals.

31. The process recited in claim 21, wherein signals (Sa) corresponding to the actual distance ($A_{ist}$) and/or the signals (Sm) corresponding to the machining depth ($Bt_{ist}$) are determined over several laser pulses (Lp) and then averaged, and control pulses for the next laser pulse group are generated from the averaged signals.

32. The process recited in claim 5 or 9, wherein a pulse width, a pulse amplitude and a pulse pause are given for the first control pulse (Pa,w,p) at the start of machining.

33. The process recited in claim 5 or 9, wherein the control pulses (Pa,w,p) of the surface distance are read out of a matrix as dimensions with at least the setpoint-/actual value deviation ($\Delta A_i$), the machining depth deviation ($\Delta Bt_i$) or the distance difference ($\Delta A_k$).

34. The process recited in claim 5 or 9, wherein a prefix pulse (Pv) is added before each control pulse (Pa,w,p) in order to minimize the response time of the laser beam.

35. The process recited in claim 5 or 9, wherein the laser is kept in a stimulated state below the laser threshold by simmering when the laser is deactivated for more than a predetermined period of time.

* * * * *